United States Patent
Lucas et al.

(10) Patent No.: US 10,562,291 B2
(45) Date of Patent: Feb. 18, 2020

(54) MEASURED SENSOR DISTANCE CORRECTION

(71) Applicant: HP INDIGO B.V., Amstelveen (NL)

(72) Inventors: Nimrod Lucas, Ness Ziona (IL); Ofer Hollenberg, Ness Ziona (IL); Ran Soffer, Yavne (IL)

(73) Assignee: HP Indigo B.V., Amstelveen (NL)

( * ) Notice: Subject to any disclaimer, the term of this patent is extended or adjusted under 35 U.S.C. 154(b) by 255 days.

(21) Appl. No.: 15/569,365

(22) PCT Filed: May 8, 2015

(86) PCT No.: PCT/EP2015/060224
§ 371 (c)(1),
(2) Date: Oct. 25, 2017

(87) PCT Pub. No.: WO2016/180441
PCT Pub. Date: Nov. 17, 2016

(65) Prior Publication Data
US 2018/0079197 A1    Mar. 22, 2018

(51) Int. Cl.
*B41F 13/02*    (2006.01)
*B65H 23/188*    (2006.01)
(Continued)

(52) U.S. Cl.
CPC .............. *B41F 13/02* (2013.01); *B41F 33/02* (2013.01); *B65H 23/1882* (2013.01);
(Continued)

(58) Field of Classification Search
CPC ..... B41F 13/02; B41F 33/02; G01D 5/34707; G01D 5/34746; G01D 18/00; B65H 23/1882; B65H 2220/03
See application file for complete search history.

(56) References Cited

U.S. PATENT DOCUMENTS 3,559,568 A    2/1971 Stanley
4,485,982 A    12/1984 St. John et al.
(Continued)

FOREIGN PATENT DOCUMENTS

CN    1141238    1/1997
CN    101391510    3/2009
(Continued)

OTHER PUBLICATIONS

Handbook of Print Media: Technologies and Production Methods, edited by Helmut Kipphan, Available online at: https://books.google.co.in/books?id=VrdqBRgSKasC&pg=PA278&lpg=PA278&dq=web+print*+marks+sensors+stretch&source=bl&ots=c7tUIX8JUm&sig=dY5vrMeTwd2JxXX2f-vO0a1rGS8&hl=en&sa=X&ei=tRv4VJOIIcORuASF3IHQBQ&ved=0CCUQ6AEwAg#v=onepage&q=web%20print*%20marks%20sensors%20stretch&f=false.

*Primary Examiner* — David Z Huang
(74) *Attorney, Agent, or Firm* — HP Inc. Patent Department (57) ABSTRACT

Example implementations relate to determining a correction factor that converts a measured sensor distance (228) to a calibrated sensor distance (222). The measured sensor distance may be based on an amount of substrate advancement through a web printing press (202) between detecting a mark (226-1, . . . , 226-N) on the substrate (204) at a first sensor (212) and detecting the mark at a second sensor (214). The calibrated sensor distance (222) may be the separation between the first sensor and the second sensor.

12 Claims, 7 Drawing Sheets

(51) Int. Cl.
*B41F 33/02* (2006.01)
*G01D 5/347* (2006.01)
*G01D 18/00* (2006.01)

(52) U.S. Cl.
CPC ..... *G01D 5/34707* (2013.01); *G01D 5/34746* (2013.01); *G01D 18/00* (2013.01); *B65H 2220/03* (2013.01); *B65H 2515/40* (2013.01); *B65H 2553/51* (2013.01); *B65H 2557/61* (2013.01)

(56) References Cited

U.S. PATENT DOCUMENTS

| | | | |
|---|---|---|---|
| 4,731,542 | A | 3/1988 | Doggett |
| 4,848,632 | A | 7/1989 | Mack et al. |
| 4,984,458 | A * | 1/1991 | Montgomery ............ B42C 3/00 226/27 |
| 6,433,499 | B1 | 5/2002 | Cote et al. |
| 8,721,030 | B2 | 5/2014 | Chen et al. |
| 2011/0218760 | A1 | 9/2011 | Takahama et al. |
| 2013/0049287 | A1 * | 2/2013 | Ueda ................... G03G 15/231 271/110 |

FOREIGN PATENT DOCUMENTS

| | | |
|---|---|---|
| CN | 102442055 | 5/2012 |
| CN | 102442083 | 5/2012 |
| EP | 2527797 | 11/2012 |

* cited by examiner

MEASURED SENSOR DISTANCE CORRECTION

BACKGROUND

A web printing press may apply tension to a web-fed print substrate. The web tension may be adjusted by changing the relative velocity of rollers or nip pressure of the feeding mechanism of the web printing press. The web tension and variations in tension may change the scaling of images printed on the substrate.

BRIEF DESCRIPTION OF THE DRAWINGS

Various examples will be described below with reference to the following figures.

DETAILED DESCRIPTION

As described above, a web printing press may apply tension to a web-fed print substrate. This web tension may be adjusted by changing the relative velocity of rollers or nip pressure of the feeding mechanism of the web printing press. The web tension and variations in web tension may cause images printed on the substrate to be distorted. This distortion may also be known as "scaling error". Calibration marks may be printed on the substrate at intended distances between marks, and automated control systems may attempt to detect the scaling error based on those marks. The control systems may also adjust the tension to correct the scaling error. However, measurements of the distance between marks as printed may be sensitive to tension variations and substrate thickness, and such control systems may inaccurately adjust the tension. Scaling error may also be manually detected by cutting a portion of the substrate from the web, measuring the distance between marks, and adjusting the web tension accordingly. However, such manual processes may be inefficient.

Figure 1:
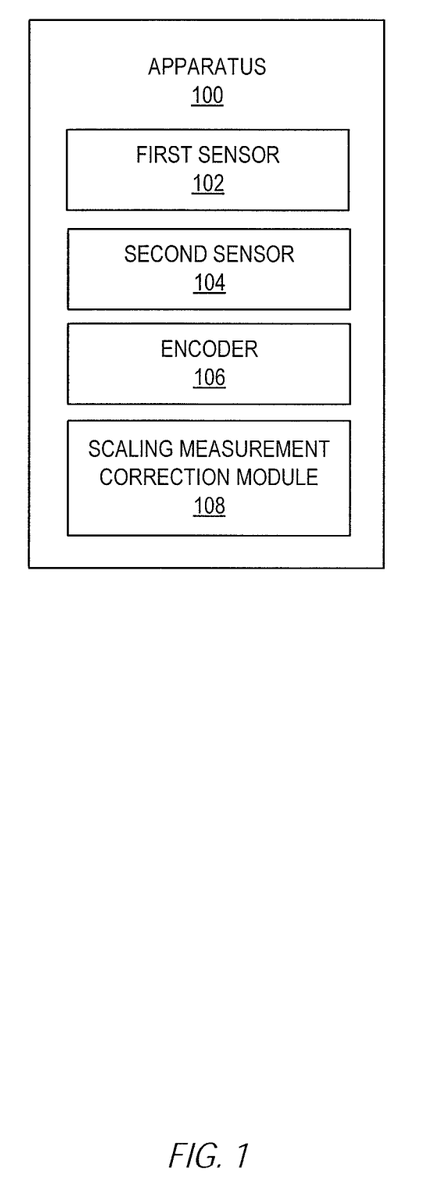
FIG. 1 is a block diagram of an example apparatus that includes a scaling measurement correction module according to an implementation.

Referring now to the figures, FIG. 1 is a block diagram of an example apparatus 100 for correcting a scaling measurement according to an implementation. In some implementations, the apparatus 100 may be included in a web printing press. The apparatus 100 may include a first sensor 102, a second sensor 104, an encoder 106, and a scaling measurement correction module 108. The term "module" as used herein may include a series of instructions encoded on a machine-readable storage medium and executable by a processor. Additionally or alternatively, a module may include one or more hardware devices including electronic circuitry for implementing functionality described herein. In some implementations, the first sensor 102 and the second sensor 104 may be mounted in the web printing press and may be separated by a calibrated sensor distance. The first sensor 102 and the second sensor 104 may be to detect marks on a substrate as the substrate advances through the press. The encoder 106 may be to detect advancement of the substrate. The scaling measurement correction module 108 may be to determine a measured sensor distance based on an amount of substrate advancement, as detected by the encoder 106, between detection of a mark by the first sensor 102 and detection of the mark by the second sensor 104. The scaling measurement correction module 108 may also be to determine a correction factor to convert the measured sensor distance to the calibrated sensor distance.

Figure 2:
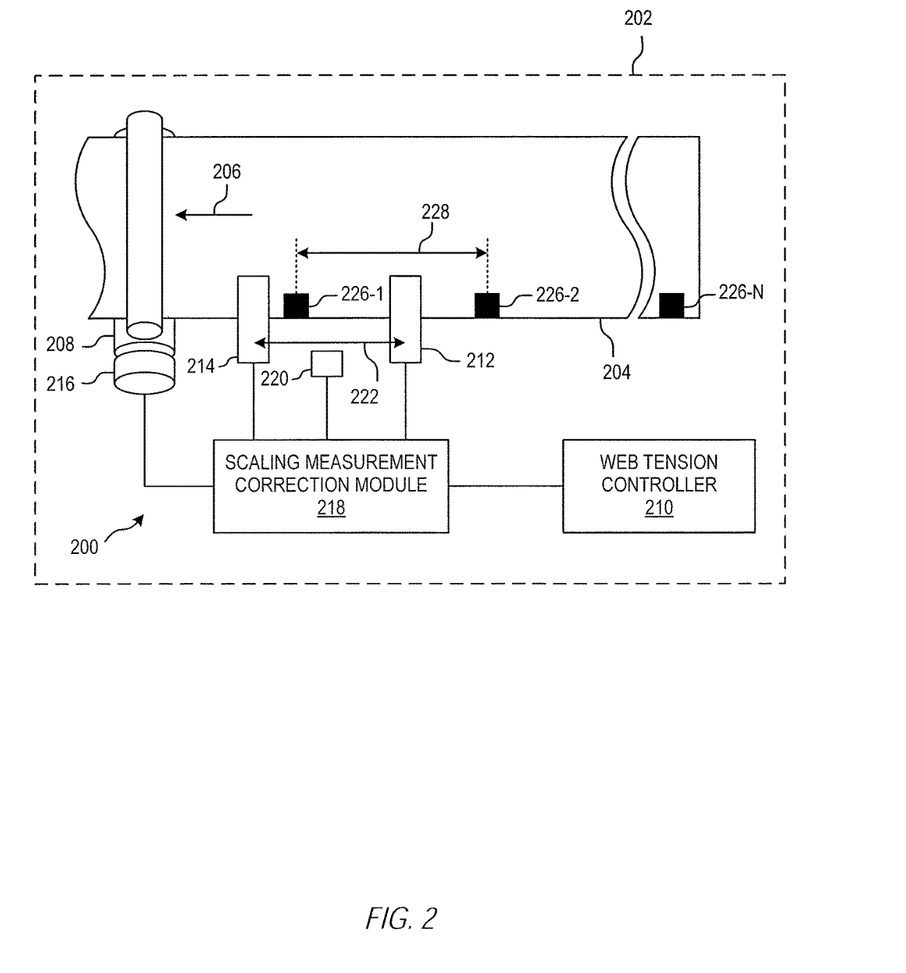
FIG. 2 is a schematic diagram of an example apparatus for correcting a scaling measurement according to an implementation.

FIG. 2 is a schematic diagram of an example apparatus 200 for correcting a scaling measurement according to an implementation. In some instances, some aspects of the apparatus 200 may be example implementations of analogous aspects of the apparatus 100 of FIG. 1. In some implementations, the apparatus 200 may be included in a web printing press 202 (also referred to herein as a "press") for printing on a web-fed substrate 204, such as paper, fabric, plastic, or other suitable printing material. For example, in some implementations, the press 202 may print on the substrate 204 (e.g., using an offset printing technique) as the substrate 204 is advanced in a web feed direction 206 (e.g., a linear direction) at least in part by nip rollers, such as a nip roller 208. In some implementations, the web printing press 202 may include a web tension controller 210 to adjust operating parameters of rollers of the press 202 (which may or may not include nip roller 208), such parameters including, for example, velocity of the rollers, nip pressure, and the like, in order to control a web tension applied to the substrate 204 as it is advanced through the press 202. In some implementations, the web tension controller 210 may include a series of instructions encoded on a machine-readable storage medium and executable by a processor, and additionally or alternatively, may include one or more hardware devices including electronic circuitry for implementing functionality described herein.

The press 202 may print a mark (e.g., 226-1; which may also be referred to as a calibration mark) on the substrate 204, and more particularly, may print a plurality of such marks (e.g., 226-1 through 226-N) along an edge of the substrate 204. Additionally, the web printing press 202 may be instructed to print the plurality of marks 226-1 through 226-N with a particular intended inter-mark distance (i.e., the distance between marks), but owing to the web tension applied to the substrate 204 and variability in the web tension, an actual inter-mark distance 228 as printed may differ from the intended inter-mark distance. Thus, it may be useful for the apparatus 200 to determine an accurate measurement of the inter-mark distance 228 as printed to be used as a control input by the web tension controller 210 to adjust the web tension on the substrate 204 and the scaling error of the press 202.

The apparatus 200 may include a first sensor 212, a second sensor 214, an encoder 216, and a scaling measurement correction module 218. In some implementations, the apparatus 200 also may include a temperature sensor 220 placed between the first sensor 212 and the second sensor 214. The functionality of the foregoing features of the apparatus 200 and interactions thereof will be described in turn.

The first sensor 212 and the second sensor 214 may be mounted in the web printing press 200 and may be separated by a calibrated sensor distance 222. More particularly, the first sensor 212 and the second sensor 214 may be separated by the calibrated sensor distance 222 along the web feed direction 206. The calibrated sensor distance 222 may be highly accurate (e.g., to at least approximately±7 µm) owing to tight engineering and manufacturing tolerances, periodic maintenance and calibration, and/or other suitable mechanisms for achieving high dimensional tolerance. The first sensor 212 and the second sensor 214 may detect the aforementioned mark or marks (226-1 through 226-N) printed on the substrate 204 as the substrate 204 advances through the press 202. In some implementations, the first sensor 212 and the second sensor 214 may be optical reflectance or transmittance sensors that, for example, can detect light-dark transitions related to the printed marks. For example, the marks 226-1 through 226-N may contrast with the substrate 204 (e.g., black marks on a white substrate 204), or if the substrate 204 is transparent, a stationary background that contrasts with the marks (e.g., a white or neutral background for black marks) may be placed underneath the substrate 204 and may be mounted to the press 202.

The encoder 216 may be to detect advancement of the substrate 204 (i.e., along web feed direction 206). In some implementations, the encoder 216 may be a rotary encoder coupled to the nip roller 208 of the web printing press 202 (e.g., coupled by a zero backlash coupling) to detect an angular displacement resulting from and corresponding to advancement of the substrate 204 over the nip roller 208, which may have a particular radius ($R_{roller}$). For example, a rotary encoder may output a number of counts corresponding to the detected angular displacement. The number of counts may be converted back into the detected angular displacement (e.g., θ in radians, degrees, etc.) based on, for example, the resolution of the rotary encoder (e.g., an 8-bit encoder may have 256 counts for a full rotation of the rotary encoder, that is, 2π radians). A corresponding linear displacement (ΔX) may then be calculated as the product of the detected angular displacement (θ) and a radius (R), as shown in equation (1) below, where $R_{roller}$ may be used as an approximation of radius R:

$$\Delta X = R * \theta \quad (1)$$

The scaling measurement correction module 218 may communicate with, and more particularly, receive output signals from the first sensor 212, the second sensor 214, the encoder 216, and the temperature sensor 220. For example, the scaling measurement correction module 218 may receive from the temperature sensor 220 a temperature measurement from between the first sensor 212 and the second sensor 214. In some implementations, the scaling measurement correction module 218 may receive optical detection signals from the first sensor 212 and the second sensor 214, such as, for example, detection signals that indicate (e.g., upon analysis by the scaling measurement correction module 218) when a mark (e.g., 226-1) crosses the sensor. As another example, the scaling measurement correction module 218 may receive from the encoder 216 a number of counts representative of an angular displacement reading, as described above, and the scaling measurement correction module 218 may convert the number of counts back to an angular displacement (e.g., in radians, degrees, etc.).

In some implementations, a signal from either one of the first sensor 212 or the second sensor 214 may trigger a reading from the encoder 216. For example, in some implementations, as the substrate 204 advances, the first sensor 212 may detect the crossing of the mark 226-1 followed by the crossing of a subsequent mark 226-2, and may trigger reading(s) from the encoder 216 (e.g., a number of counts) in response to the crossings. In some implementations, the scaling measurement correlation module 218 may convert the number of encoder counts between the detection of mark 226-1 and the detection of mark 226-2 into a linear displacement that may correlate to (or may be a measurement of) the distance between the marks 226-1 and 226-2 (inter-mark distance 228), in the manner described above with respect to equation (1). This calculated linear displacement of the inter-mark distance 228 may be referred to as a scaling measurement. However, in some instances, the scaling measurement may be a less than accurate measurement of the inter-mark distance 228, if $R_{roller}$ is used as an approximation for R in equation (1) owing at least in part to variations in thickness of the substrate 204 and variations in web tension applied to the substrate 204, as will be explained further with reference to FIGS. 3A and 3B.

Figure 3A:
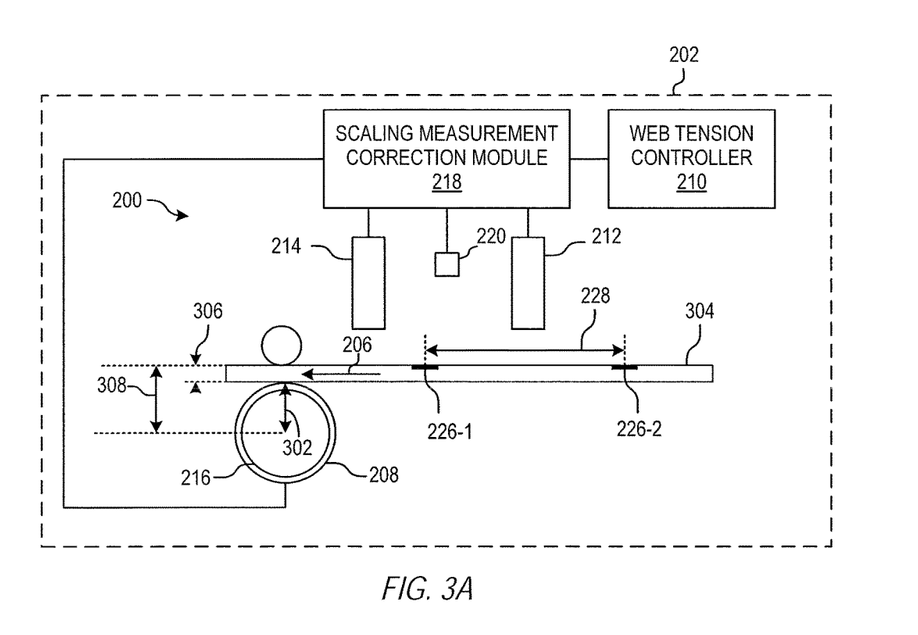
FIG. 3A is a side view of an example apparatus for correcting a scaling measurement according to an implementation.
Figure 3B:
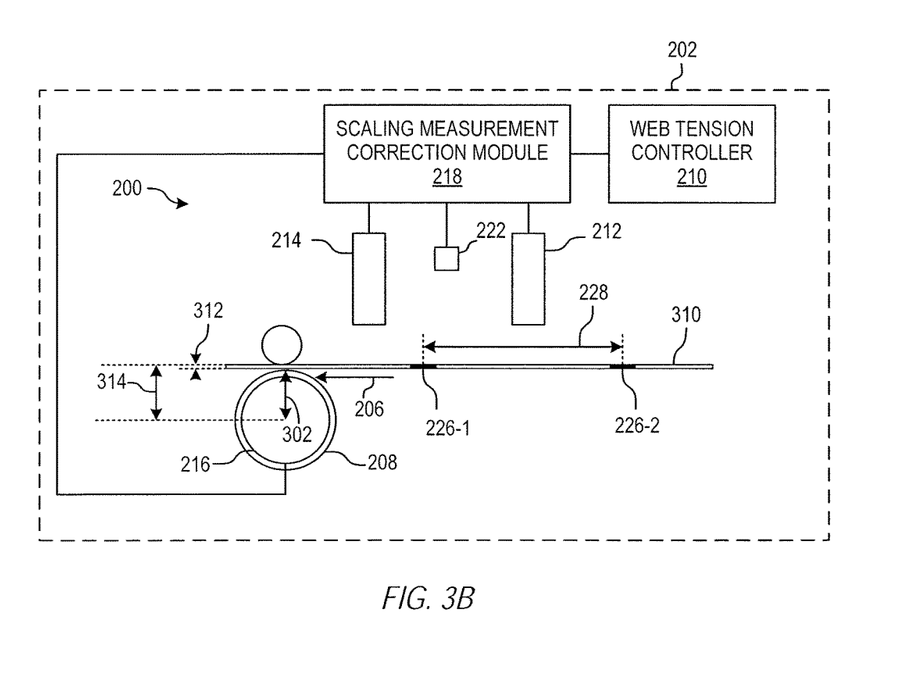
FIG. 3B is a side view of an example apparatus for correcting a scaling measurement according to an implementation.

FIGS. 3A and 3B are side views of the web printing press 202 and the apparatus 200 of FIG. 2. FIG. 3A and FIG. 3B respectively illustrate a substrate 304 with a thickness 306 and a substrate 310 with a thickness 312, both substrates being advanced through the press 202, over the nip roller 208 (which has a radius 302 of $R_{roller}$) coupled to the encoder 216. In the present illustrations of FIGS. 3A and 3B, thickness 306 is greater than thickness 312, which may be by design (e.g., different substrate materials, dimensions, etc.) or may be due to different web tension (e.g., more or less tension may stretch a same substrate to different thicknesses). The marks 226-1 and 226-2 are printed on the surface of the substrates 304 and 310. As the substrate 304 passes over the nip roller 208, an effective radius 308 may be formed by the sum of the roller radius 302 and the substrate thickness 306. Similarly, for the substrate 310, an effective radius 314 may be formed by the sum of the roller radius 302 and the substrate thickness 312. The effective radius 308 is greater than the effective radius 314, owing to the different substrate thicknesses. Thus, measurement of the inter-mark distance 228 (i.e., the scaling measurement) using equation (1) may be more accurate if the effective radii 308, 314 are used for the radius R in equation (1) rather than $R_{roller}$. However, the effective radius may not be available for such calculation.

Referring again to FIG. 2, the scaling measurement correction module 218 may be to determine a correction factor to compensate for less than accurate measurements of linear displacements, including the scaling measurement, as described above. The scaling measurement correction module 218 may determine a measured sensor distance based on an amount of advancement of substrate 204 as detected by the encoder 216 (e.g., a number of counts representing an angular displacement detected by a rotary encoder 216 and converted to a linear displacement), between detection of a mark 226-1 by the first sensor 212 and detection of the mark 226-1 by the second sensor 214. For example, the measured sensor distance may be calculated by the scaling measurement correction module 218 as the product of the radius of the nip roller 208 ($R_{roller}$) and the angular displacement of the encoder 216 between two trigger points: detection of the mark 226-1 by the first sensor 212 and detection of the mark 226-1 by the second sensor 214 ($\theta_{sensor\ 1-sensor\ 2}$, in radians for example). In some implementations, the measured sensor distance may be expressed as the following equation (2):

$$\text{Measured Sensor Distance} = R_{roller} * \theta_{sensor\ 1\text{-}sensor\ 2} \quad (2)$$

The scaling measurement correction module 218 may then determine a correction factor to convert the measured sensor distance to the calibrated sensor distance 222. In some implementations, the calibrated sensor distance 222 may be stored as a programmable constant in a machine-readable medium included in or accessible by the scaling measurement correction module 218. For example, in some implementations, the correction factor ($C_{correction}$) may be determined by dividing the measured sensor distance by the calibrated sensor distance 222 (that is, a ratio of the measured sensor distance to the calibrated sensor distance), as expressed in the following equation (3):

$$C_{correction} = \text{Measured Sensor Distance/Calibrated Sensor Distance} \quad (3)$$

In some implementations, the correction factor may be determined in other suitable ways, such as, for example, by subtracting the calibrated sensor distance from the measured sensor distance.

Using the correction factor ($C_{correction}$), the scaling measurement correction module 218 may determine a more accurate scaling measurement, which the web tension controller may compare with the intended inter-mark distance to adjust the web tension on the substrate 204. For example, in some implementations, the scaling measurement correction module 218 may determine a scaling measurement based on an amount of advancement of substrate 204, as detected by the encoder 216 (e.g., as a number of counts representing an angular displacement detected by the rotary encoder 216 and converted to a linear displacement), between detection of the mark 226-1 by the first sensor 212 and detection of a subsequent mark 226-2 by the first sensor 212. For example, the scaling measurement may be calculated by the scaling measurement correction module 218 as the product of the radius of the nip roller 208 ($R_{roller}$) and the angular displacement of the encoder 216 between two trigger points: detection of the mark 226-1 by the first sensor 212 and detection of the mark 226-2 again by the first sensor 212 ($\theta_{mark\ 1\text{-}mark\ 2}$, in radians for example). Owing to variations in the substrate 204 thickness and web tension, the scaling measurement may be deemed an estimate of the inter-mark distance 228 (e.g., as measured by a calibrated ruler). It should be noted that, in the some implementations, the second sensor 214 may be used instead of the first sensor 212 to detect both the mark 226-1 and the subsequent mark 226-2 in the foregoing example. In some implementations, the scaling measurement may be expressed as the following equation (4):

$$\text{Scaling Measurement} = R_{roller} * \theta_{sensor\ 1\text{-}sensor\ 2} \quad (4)$$

The scaling measurement correction module 218 may then convert the scaling measurement to a corrected scaling measurement using the correction factor ($C_{correction}$). For example, the corrected scaling measurement may be calculated by the scaling measurement correction module 218 as the product of the scaling measurement and the inverse of the correction factor ($C_{correction}$), as expressed by the following equation (5):

$$\text{Corrected Scaling Measurement} = \text{Scaling Measurement} * C_{correction}^{-1} \quad (5)$$

In some implementations, the scaling measurement may be converted to the corrected scaling measurement using the correction factor in other suitable ways, depending at least in part on how the correction factor was determined. For example, the correction factor may be added to or subtracted from the scaling measurement to calculate the corrected scaling measurement, particularly if the correction factor is the difference between the calibrated sensor distance and the measured sensor distance. In some implementations, the scaling measurement correction module 218 may transmit the corrected scaling measurement to the web tension controller 210 of the press 202. As described above, the web tension controller 210 may compare the corrected scaling measurement to the intended inter-mark distance and adjust the web tension to minimize the difference between those values.

In some cases, temperature changes may result in thermal expansion or contraction of parts of the press 202, and more particularly, temperature changes near the first sensor 212 and the second sensor 214 may cause the calibrated sensor distance 222 to change. As described above, in some implementations, the apparatus 200 may include a temperature sensor 220 that may output a temperature measurement from between the first sensor 212 and the second sensor 214 to the scaling measurement correction module 218. The scaling measurement correction module 218 may adjust the correction factor based on the temperature measured by the temperature sensor 220. For example, the scaling measurement correction module 218 may adjust the calibrated sensor distance value used in equation (3) based on a known relationship between the temperature and the calibrated sensor distance 222. For example, an increased temperature may be known to correlate to an increased calibrated sensor distance 222.

In some implementations, the scaling measurement correction module 218 may update the correction factor (e.g., as calculated by equation (3)) for each mark (or at least some of the marks) of the plurality of marks 226-1 through 226-N, as each mark passes the first sensor 212 and the second sensor 214. Additionally, the scaling measurement correction module may determine a corrected scaling measurement using an updated correction factor for each pair of consecutive marks (e.g., marks 226-1 and 226-2). Accordingly, the apparatus 200 may provide frequent and accurate input to the web tension controller 210.

Figure 4:
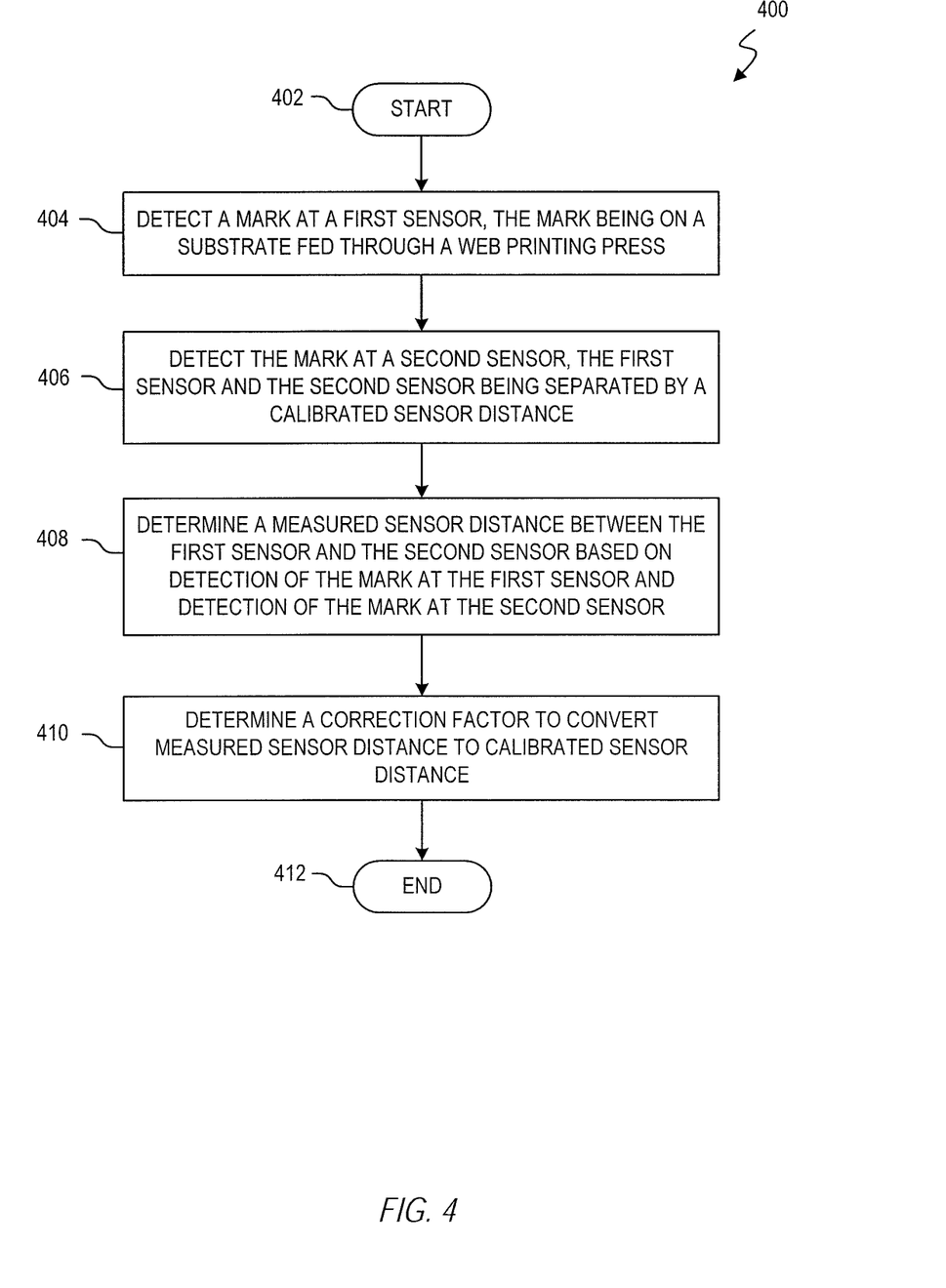
FIG. 4 is an example method for determining a correction factor according to an implementation.

FIG. 4 is a flowchart of an example method 400 for determining a correction factor according to an implementation. Method 400 may be described below as being executed or performed by an apparatus, such as apparatus 100 of FIG. 1. Various other suitable systems may be used as well, such as, for example, apparatus 200 of FIG. 2. Method 400 may be implemented in the form of executable instructions stored on a machine-readable storage medium and executed by at least one processor of the apparatus 100, and/or in the form of electronic circuitry. In some implementations of the present disclosure, one or more blocks of method 400 may be executed substantially concurrently or in a different order than shown in FIG. 4. In some implementations of the present disclosure, method 400 may include more or less blocks than are shown in FIG. 4. In some implementations, one or more of the blocks of method 400 may, at certain times, be ongoing and/or may repeat.

The method 400 may begin at block 402, and continue to block 404, where the apparatus 100 may detect a mark at a first sensor (e.g., 102), the mark being on a substrate fed through a web printing press. At block 406, the apparatus 100 may detect the mark at a second sensor (e.g., 104), the first sensor and the second sensor being separated by a calibrated sensor distance. For example, the first sensor and the second sensor may be mounted at different locations within the apparatus 100 (or more generally, mounted in the web printing press in some implementations), separated by the calibrated sensor distance. At block 408, the apparatus 100 may determine a measured sensor distance between the first sensor and the second sensor based on the detecting the mark at the first sensor (e.g., at block 404) and the detecting the mark at the second sensor (e.g., at block 406). In some implementations, the apparatus 100 determines the measured sensor distance at least in part by a rotary encoder (e.g., encoder 106) detecting advancement of the substrate between the detecting the mark at the first sensor (e.g., at block 404) and the detecting the mark at the second sensor (e.g., at block 406). At block 408, the apparatus 100 may determine a correction factor to convert the measured sensor distance to the calibrated sensor distance. For example, the correction factor may be the measured sensor distance determined at block 406 divided by the calibrated sensor distance. In some implementations, the apparatus 100 may perform block 406 using a scaling measurement correction module (e.g., 108). In some implementations, the mark is a plurality of marks on the substrate, and the measured sensor distance and the correction factor may be determined for each mark of the plurality of marks. In other words, the method 400 (and more particularly, blocks 404, 406, 408, 410) may be repeated for a plurality of marks as the substrate is advanced or fed through the web printing press. At block 412, the method 400 may end.

Figure 5:
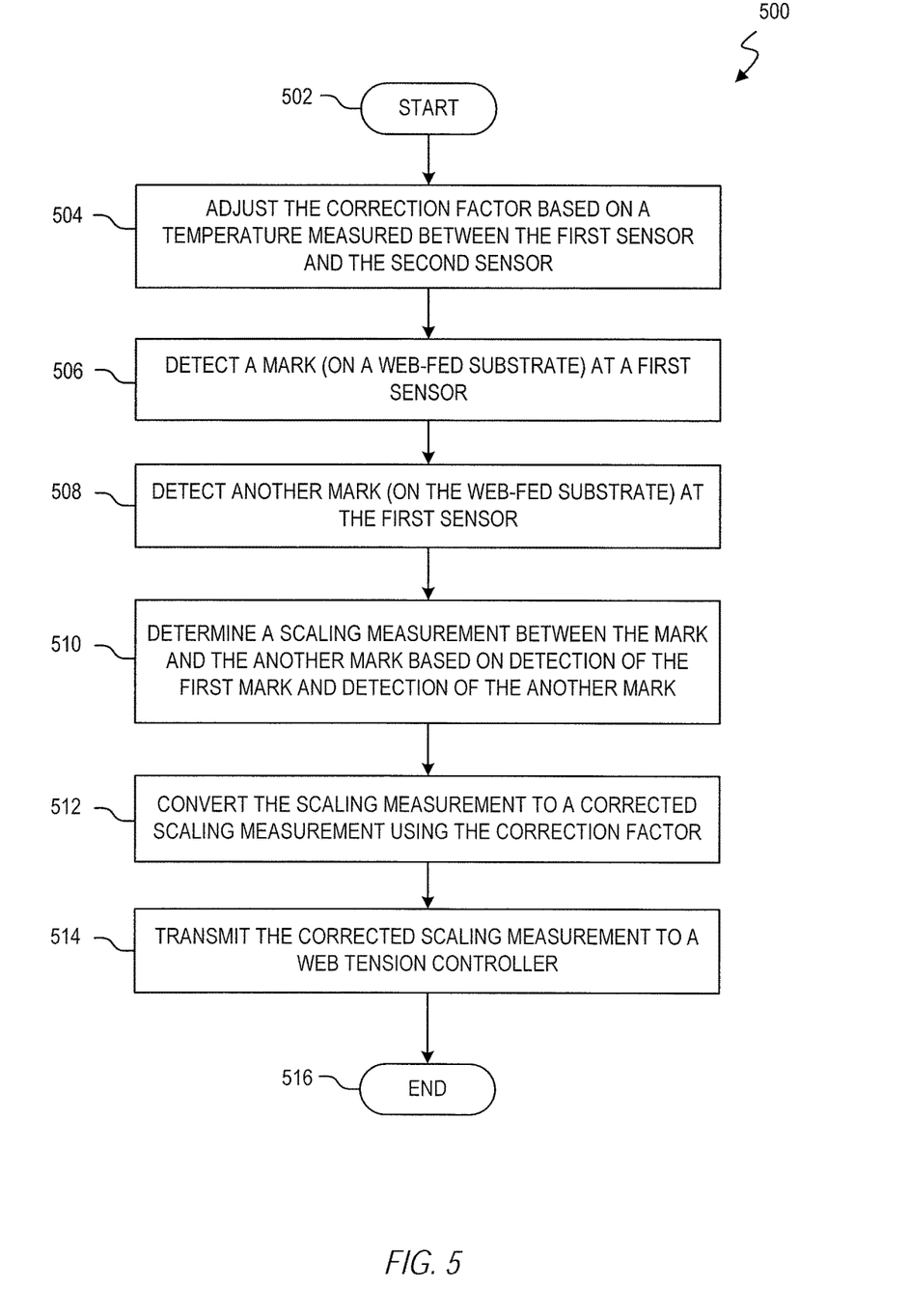
FIG. 5 is an example method for correcting a scaling measurement according to an implementation.

FIG. 5 is a flowchart of an example method 500 for correcting a scaling measurement according to an implementation. Method 500 may be described below as being executed or performed by an apparatus, such as apparatus 200 of FIG. 2. Various other suitable systems may be used as well to perform at least part of method 500, such as, for example, apparatus 100 of FIG. 1. Method 500 may be implemented in the form of executable instructions stored on a machine-readable storage medium and executed by at least one processor of the apparatus 200, and/or in the form of electronic circuitry. In some implementations of the present disclosure, one or more blocks of method 500 may be executed substantially concurrently or in a different order than shown in FIG. 5. In some implementations of the present disclosure, method 500 may include more or less blocks than are shown in FIG.5. In some implementations, one or more of the blocks of method 500 may, at certain times, be ongoing and/or may repeat. In some implementations, prior to beginning the method 500, the apparatus 200 may determine a correction factor by performing method 400.

The method 500 may begin at block 502, and continue to block 504 where the apparatus 200 (or a scaling measurement correction module, e.g., 218) may adjust a correction factor based on a temperature measured between a first sensor (e.g., 212) and a second sensor (e.g., 214), by a temperature sensor (e.g., 220) for example. The correction factor may be, for example, the correction factor determined according to block 410 of method 400. At block 506, the apparatus 200 may detect a mark (e.g., 226-1) at the first sensor, the mark being on a substrate (e.g., 204) fed through a web printing press (e.g., 202). At block 508, the apparatus 200 may detect, at the first sensor, another mark (e.g., 226-2) on the substrate. At block 510, the apparatus 200 (or the scaling measurement correction module) may determine a scaling measurement between the mark and the another mark based on the detecting the mark at the first sensor (e.g., at block 506) and the detecting the another mark at the first sensor (e.g., at block 508). For example, in some implementations, the apparatus 200 may determine the scaling measurement in part by a rotary encoder (e.g., encoder 216) detecting advancement of the substrate 204 between the detecting the mark at the first sensor (that is, a first trigger event) and the detecting the another mark at the first sensor (that is, a second trigger event). At block 512, the apparatus 200 (or the scaling measurement correction module) may convert the scaling measurement determined at block 510 to a corrected scaling measurement using the correction factor. At block 514, the apparatus 200 (or the scaling measurement correction module) may transmit the corrected scaling measurement determined at block 512 to a web tension controller (e.g., 210). In some implementations, the mark 226-1 and the another mark may be among a plurality of marks on the substrate, and the method 500 (and more particularly, blocks 506, 508, 510, 512, 514) may be repeated for pairs of consecutive or adjacent marks. The method 500 may end at block 516.

Figure 6:
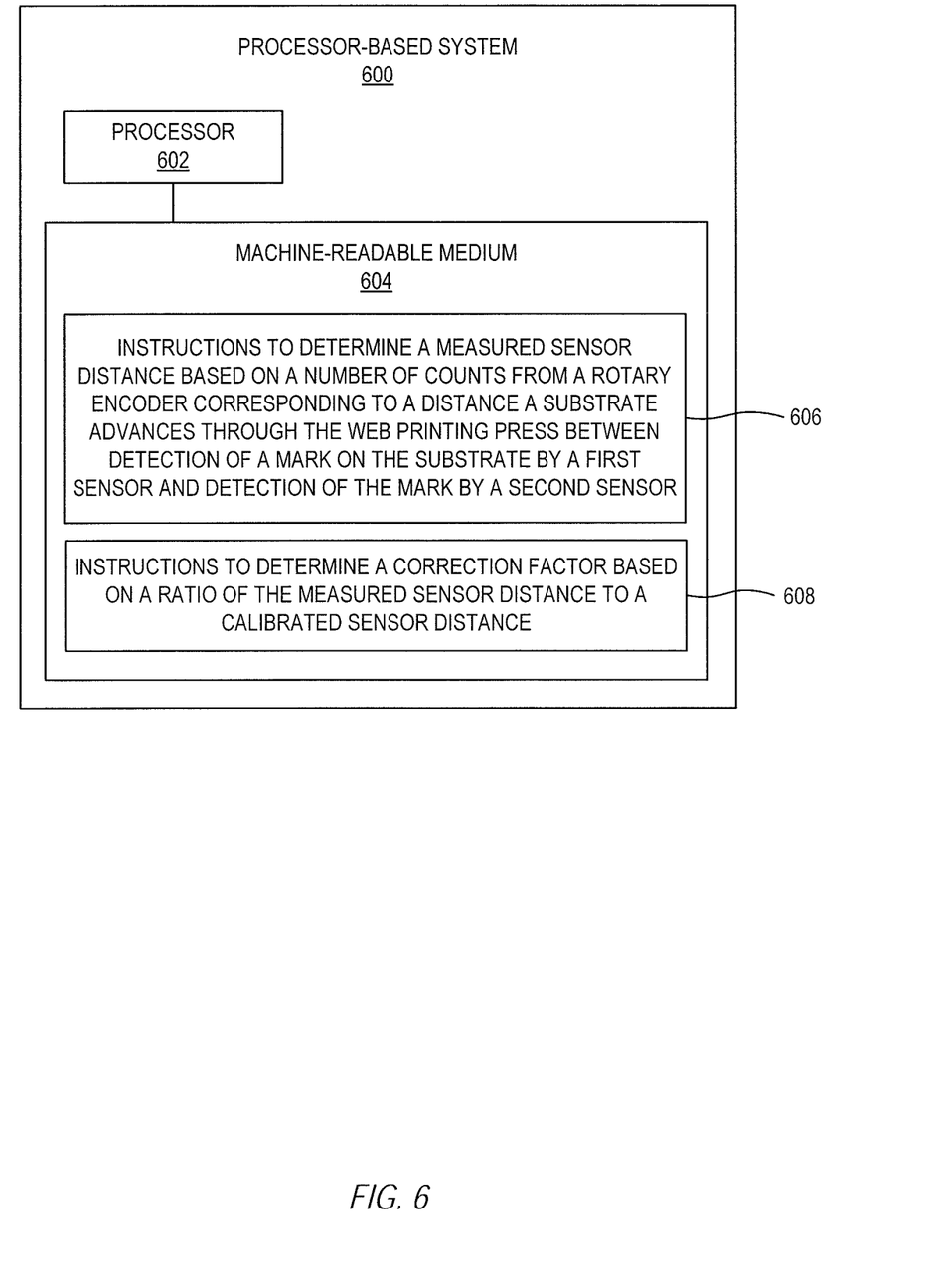
FIG. 6 is a block diagram showing a non-transitory, machine-readable medium encoded with example instructions to determine a correction factor.

FIG. 6 is a block diagram illustrating a processor-based system 600 that includes a machine-readable medium encoded with example instructions to determine a correction factor according to an example implementation. In some example implementations, the system 600 may be or may form part of a printing device, such as a web printing press. In some implementations, the system 600 is a processor-based system and may include a processor 602 coupled to a machine-readable medium 604. The processor 602 may include a single-core processor, a multi-core processor, an application-specific integrated circuit, a field programmable gate array, and/or other hardware device suitable for retrieval and/or execution of instructions from the machine-readable medium 604 (e.g., instructions 606, 608) to perform functions related to various examples. Additionally or alternatively, the processor 602 may include electronic circuitry for performing the functionality described herein, including the functionality of instructions 606 and/or 608. With respect to the executable instructions represented as boxes in FIG. 6, it should be understood that part or all of the executable instructions and/or electronic circuits included within one box may, in alternate implementations, be included in a different box shown in the figures or in a different box not shown.

The machine-readable medium 604 may be any medium suitable for storing executable instructions, such as random access memory (RAM), electrically erasable programmable read-only memory (EEPROM), flash memory, hard disk drives, optical discs, and the like. In some example implementations, the machine-readable medium 604 may be a tangible, non-transitory medium, where the term "non-transitory" does not encompass transitory propagating signals. The machine-readable medium 604 may be disposed within system 600, as shown in FIG. 6, in which case the executable instructions may be deemed "installed" on the system 600. Alternatively, the machine-readable medium 604 may be a portable (e.g., external) storage medium, for example, that allows system 600 to remotely execute the instructions or download the instructions from the storage medium. In this case, the executable instructions may be part of an "installation package." As described further herein below, the machine-readable medium 604 may be encoded with a set of executable instructions 606, 608.

Instructions 606, when executed by the processor 602, may determine a measured sensor distance based on a number of counts from a rotary encoder coupled to a roller of a web printing press, the number of counts corresponding to a distance a substrate advances through the web printing press between detection of a mark on the substrate by a first sensor and detection of the mark by a second sensor, the first sensor and the second sensor being separated by a calibrated sensor distance. Instructions 608, when executed by the processor 602, may determine a correction factor based on a ratio of the measured sensor distance to the calibrated sensor distance.

Figure 7:
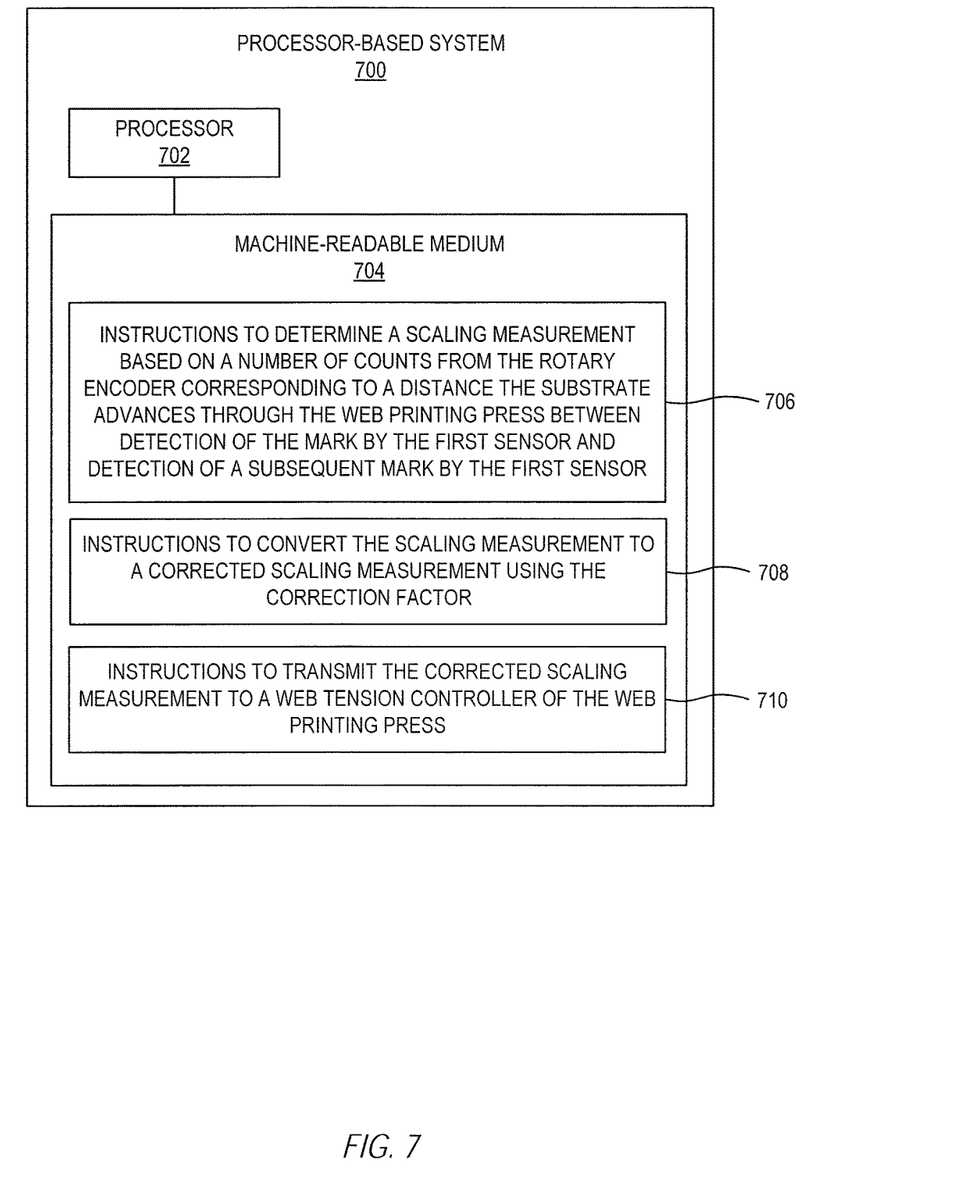
FIG. 7 is a block diagram showing a non-transitory, machine-readable medium encoded with example instructions to determine a corrected scaling measurement.

FIG. 7 is a block diagram illustrating a processor-based system 700 that includes a machine-readable medium encoded with example instructions to determine a correction factor according to an example implementation. In some example implementations, the system 700 may be or may form part of a printing device, such as a web printing press. In some implementations, the system 700 is a processor-based system and may include a processor 702 coupled to a machine-readable medium 704. The processor 702 may include a single-core processor, a multi-core processor, an application-specific integrated circuit, a field programmable gate array, and/or other hardware device suitable for retrieval and/or execution of instructions from the machine-readable medium 704 (e.g., instructions 706, 708, 710) to perform functions related to various examples. Additionally or alternatively, the processor 702 may include electronic circuitry for performing the functionality described herein, including the functionality of instructions 706, 708, and/or 710. With respect to the executable instructions represented as boxes in FIG. 7, it should be understood that part or all of the executable instructions and/or electronic circuits included within one box may, in alternate implementations, be included in a different box shown in the figures or in a different box not shown.

The machine-readable medium 704 may be any medium suitable for storing executable instructions, such as random access memory (RAM), electrically erasable programmable read-only memory (EEPROM), flash memory, hard disk drives, optical discs, and the like. In some example implementations, the machine-readable medium 704 may be a tangible, non-transitory medium, where the term "non-transitory" does not encompass transitory propagating signals. The machine-readable medium 704 may be disposed within system 700, as shown in FIG. 7, in which case the executable instructions may be deemed "installed" on the system 700. Alternatively, the machine-readable medium 704 may be a portable (e.g., external) storage medium, for example, that allows system 700 to remotely execute the instructions or download the instructions from the storage medium. In this case, the executable instructions may be part of an "installation package." As described further herein below, the machine-readable medium 704 may be encoded with a set of executable instructions 706, 708, 710.

Instructions 706, when executed by the processor 702, may determine a scaling measurement based on a number of counts from the rotary encoder corresponding to a distance the substrate advances through the web printing press between detection of the mark by the first sensor and detection of a subsequent mark by the first sensor. Instructions 708, when executed by the processor 702, may convert the scaling measurement to a corrected scaling measurement using the correction factor. Instructions 710, when executed by the processor 702, may transmit the corrected scaling measurement to a web tension controller of the web printing press.

In view of the foregoing description, it can be appreciated that error and inaccuracy in a scaling measurement, determined by an apparatus that detects calibration marks on a web-fed substrate, may be reduced, corrected, or compensated by calibrating apparatus measurements against a calibrated sensor distance between sensors of the apparatus. Moreover, by virtue of improving the accuracy of the scaling measurement, a web tension controller may control the tension applied to the web-fed substrate in a web printing press with greater accuracy.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. An apparatus comprising:
a first sensor and a second sensor mounted in a web printing press and separated by a calibrated sensor distance, the first and second sensors to detect marks on a substrate as the substrate advances through the press;
an encoder to detect advancement of the substrate; and
a scaling measurement correction module to:
determine a measured sensor distance based on an amount of substrate advancement, as detected by the encoder, between detection of a mark by the first sensor and detection of the mark by the second sensor;
determine a scaling measurement based on an amount of substrate advancement, as detected by the encoder, between detection of the mark by the first sensor and detection of a subsequent mark by the first sensor;
determine a correction factor to convert the measured sensor distance to the calibrated sensor distance;
convert the scaling measurement to a corrected scaling measurement using the correction factor, and
transmit the corrected scaling measurement to a web tension controller of the web printing press.

2. The apparatus of claim 1, further comprising a temperature sensor placed between the first sensor and the second sensor, wherein the scaling measurement correction module is to adjust the correction factor based on a temperature measured by the temperature sensor.

3. The apparatus of claim 1, wherein the calibrated sensor distance is accurate to at least seven microns.

4. The apparatus of claim 1, wherein the mark is among a plurality of marks printed on the substrate, and the scaling measurement correction module is to update the correction factor for each mark of the plurality of marks as each mark passes the first sensor and the second sensor.

5. The apparatus of claim 1, wherein the encoder is a rotary encoder coupled to a nip roller of the web printing press.

6. The apparatus of claim 1, wherein the correction factor is the measured sensor distance divided by the calibrated sensor distance.

7. A method comprising:
detecting a mark at a first sensor, the mark being on a substrate fed through a web printing press;
detecting the mark at a second sensor, the first sensor and the second sensor being separated by a calibrated sensor distance;
determining a measured sensor distance between the first sensor and the second sensor based on the detecting the mark at the first sensor and the detecting the mark at the second sensor;
detecting, at the first sensor, another mark on the substrate;

determining a scaling measurement between the mark and the another mark based on the detecting the mark at the first sensor and the detecting the another mark at the first sensor;

determining a correction factor to convert the measured sensor distance to the calibrated sensor distance;

converting the scaling measurement to a corrected scaling measurement using the correction factor; and transmitting the corrected scaling measurement to a web tension controller.

8. The method of claim 7, wherein the correction factor is the measured sensor distance divided by the calibrated sensor distance.

9. The method of claim 7, wherein the determining the measured sensor distance is performed in part by a rotary encoder detecting advancement of the substrate between the detecting the mark at the first sensor and the detecting the mark at the second sensor, and the determining the scaling measurement is performed in part by the rotary encoder detecting advancement of the substrate between the detecting the mark at the first sensor and the detecting the another mark at the first sensor.

10. The method of claim 7, wherein the mark is among a plurality of marks on the substrate, the measured sensor distance and the correction factor are determined for each mark of the plurality of marks.

11. The method of claim 7, further comprising adjusting the correction factor based on a temperature measured between the first sensor and the second sensor.

12. A non-transitory machine readable medium storing instructions executable by a processor, the non-transitory machine readable medium comprising:

instructions to determine a measured sensor distance based on a number of counts from a rotary encoder coupled to a roller of a web printing press, the number of counts corresponding to a distance a substrate advances through the web printing press between detection of a mark on the substrate by a first sensor and detection of the mark by a second sensor, the first sensor and the second sensor being separated by a calibrated sensor distance;

instructions to determine a scaling measurement based on a number of counts from the rotary encoder corresponding to a distance the substrate advances through the web printing press between detection of the mark by the first sensor and detection of a subsequent mark by the first sensor;

instructions to determine a correction factor based on a ratio of the measured sensor distance to the calibrated sensor distance;

instructions to convert the scaling measurement to a corrected scaling measurement using the correction factor, and instructions to transmit the corrected scaling measurement to a web tension controller of the web printing press.

* * * * *